US012539312B2

(12) United States Patent
Brodin et al.

(10) Patent No.: US 12,539,312 B2
(45) Date of Patent: Feb. 3, 2026

(54) USE OF MATERIALS MADE OF CROSS-LINKED β-CYCLODEXTRINS FOR THE TREATMENT OF TUBERCULOSIS

(71) Applicants: INSERM (INSTITUT NATIONAL DE LA SANTÉ ET DE LA RECHERCHE MÉDICALE), Paris (FR); UNIVERSITÉ DE LILLE, Lille (FR); INSTITUT PASTEUR DE LILLE, Lille (FR); CENTRE NATIONAL DE LA RECHERCHE SCIENTIFIQUE (CNRS), Paris (FR); UNIVERSITÉ PARIS-SACLAY, Saint-Aubin (FR)

(72) Inventors: Priscille Brodin, Lille (FR); Alain Boulard, Lille (FR); Ruxandra Gref, Orsay (FR); Arnaud Machelart, Lille (FR)

(73) Assignees: INSERM (INSTITUT NATIONAL DE LA SANTÉ ET DE LA RECHERCHE MÉDICALE), Paris (FR); UNIVERSITÉ DE LILLE, Lille (FR); INSTITUT PASTEUR DE LILLE, Lille (FR); CENTRE NATIONAL DE LA RECHERCHE SCIENTIFIQUE (CNRS), Paris (FR); UNIVERSITÉ PARIS-SACLAY, Paris (FR)

( * ) Notice: Subject to any disclaimer, the term of this patent is extended or adjusted under 35 U.S.C. 154(b) by 1102 days.

(21) Appl. No.: 17/432,601

(22) PCT Filed: Feb. 20, 2020

(86) PCT No.: PCT/EP2020/054509
§ 371 (c)(1),
(2) Date: Aug. 20, 2021

(87) PCT Pub. No.: WO2020/169747
PCT Pub. Date: Aug. 27, 2020

(65) Prior Publication Data
US 2022/0062326 A1    Mar. 3, 2022

(30) Foreign Application Priority Data

Feb. 21, 2019 (EP) .................................... 19305211

(51) Int. Cl.
| | | |
|---|---|---|
| A61K 31/738 | (2006.01) |
| A61K 31/4375 | (2006.01) |
| A61K 31/4709 | (2006.01) |
| A61K 31/496 | (2006.01) |
| A61K 31/5383 | (2006.01) |
| A61K 31/7036 | (2006.01) |
| A61P 31/06 | (2006.01) |

(52) U.S. Cl.
CPC ........ *A61K 31/738* (2013.01); *A61K 31/4375* (2013.01); *A61K 31/4709* (2013.01); *A61K 31/496* (2013.01); *A61K 31/5383* (2013.01); *A61K 31/7036* (2013.01); *A61P 31/06* (2018.01)

(58) Field of Classification Search
CPC .............. A61K 31/738; A61K 31/4375; A61K 31/4709; A61K 31/496; A61K 31/5383; A61K 31/7036; A61K 31/724; A61K 47/40; A61K 9/007; A61K 9/516; A61K 2300/00; A61P 31/06
USPC ......................................................... 514/58
See application file for complete search history.

(56) References Cited

PUBLICATIONS

Dorwald F. A., Side Reactions in Organic Synthesis, 2005, Preface, Wiley: VCH, Weinheim.*
Salzano et al, International Journal of Pharmaceutics, 2017, 531(2), 577-587.*
Garg et al, Current Pharmaceutical Design, 2015, 21, 3076-3089.*
Boldescu et al: "Role of Cyclodextrins in New Antimycobacterial Formulations", Chemistry Journal of Moldova, vol. 9, No. 1, pp. 8-13, Jun. 1, 2014.
Costa-Gouveia et al: "How can nanoparticles contribute to antituberculosis therapy?" Drug Discovery Today, vol. 22, No. 3, pp. 600-607, Jan. 27, 2017.

(Continued)

*Primary Examiner* — Ganapathy Krishnan
(74) *Attorney, Agent, or Firm* — WCF IP

(57) ABSTRACT

Multi-drug resistant tuberculosis (TB) is a major public health problem concerning about half a million cases each year. Patients hardly adhere to the current strict treatment consisting of more than 10,000 tablets over a 2-year period. There is a clear need for efficient and better-formulated medications. The inventors have previously shown that nanoparticles made of cross-linked poly-β-cyclodextrins (pβCD) are efficient vehicles for pulmonary delivery of powerful combinations of anti-TB drugs. Here, they report that in addition to be efficient drug carriers, pβCD nanoparticles are endowed with intrinsic antibacterial properties. Indeed, empty pβCD are able to impair *M. tuberculosis* (Mtb) establishment after pulmonary administration in mice. pβCD hamper colonisation of macrophages by Mtb by interfering with lipid rafts, without inducing toxicity. Moreover, pβCD provoke macrophage apoptosis leading to depletion of infected cells, thus creating a lung micro-environment detrimental to Mtb persistence. Taken together, the results suggest that materials made of cross-linked β-cyclodextrins (e.g. nanoparticles) loaded or not with antibiotics play an antibacterial action by its own and could be used as carrier in drug regimen formulations effective against TB.

6 Claims, 3 Drawing Sheets

(56) References Cited

PUBLICATIONS

Figure 1A:
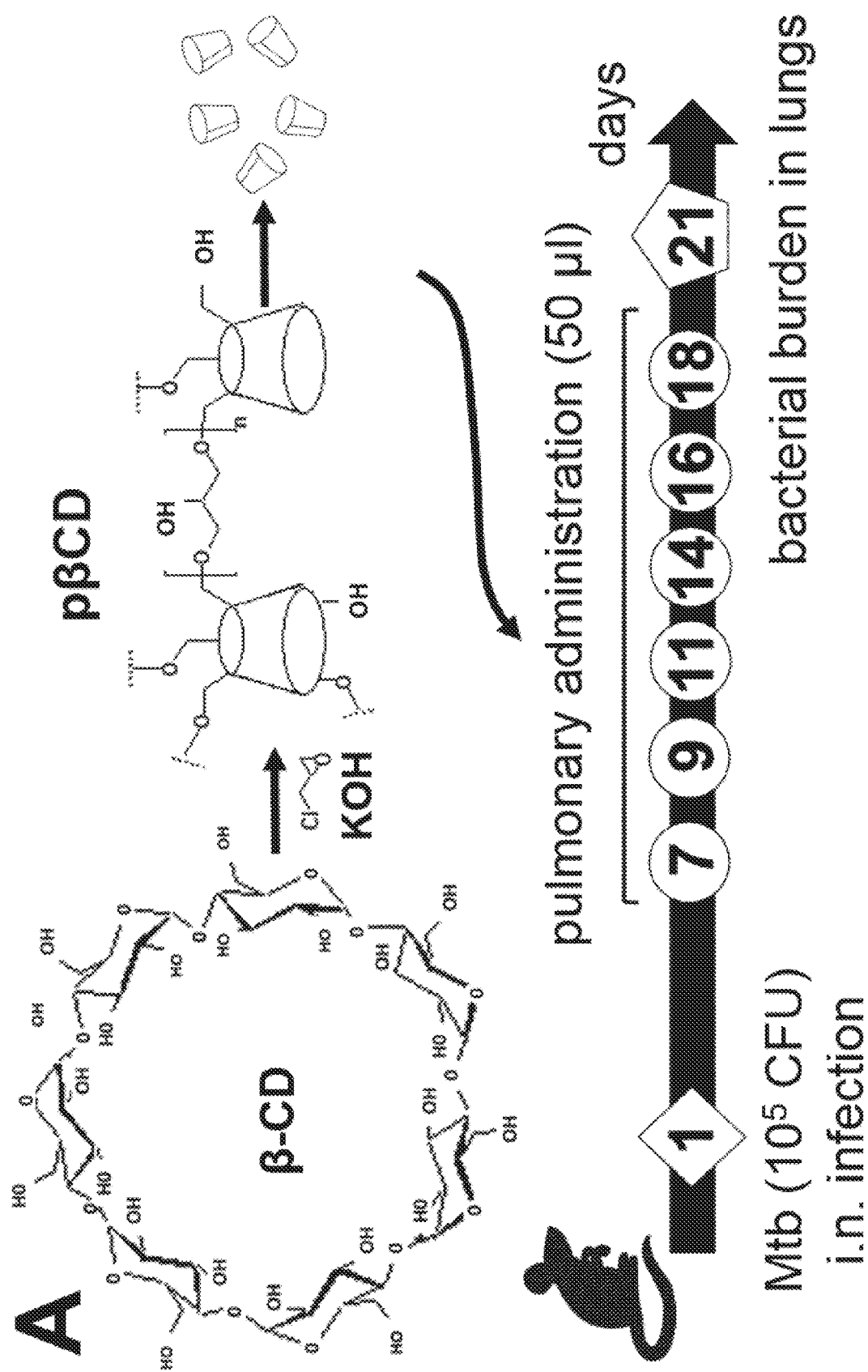

Machelart et al: "Intrinsic Antibacterial Activity of Nanoparticles Made of [beta]-Cyclodextrins Potentiates Their Effect as Drug Nanocarriers against Tuberculosis", ACS Nano, vol. 13, No. 4, pp. 3992-4007, Mar. 1, 2019.

Salzano et al: "Cyclodextrin-based nanocarriers containing a synergic drug combination: A potential formulation for pulmonary administration of antitubercular drugs", International Journal of Pharmaceutics, vol. 531, No. 2, pp. 577-587, May 15, 2017.

\* cited by examiner

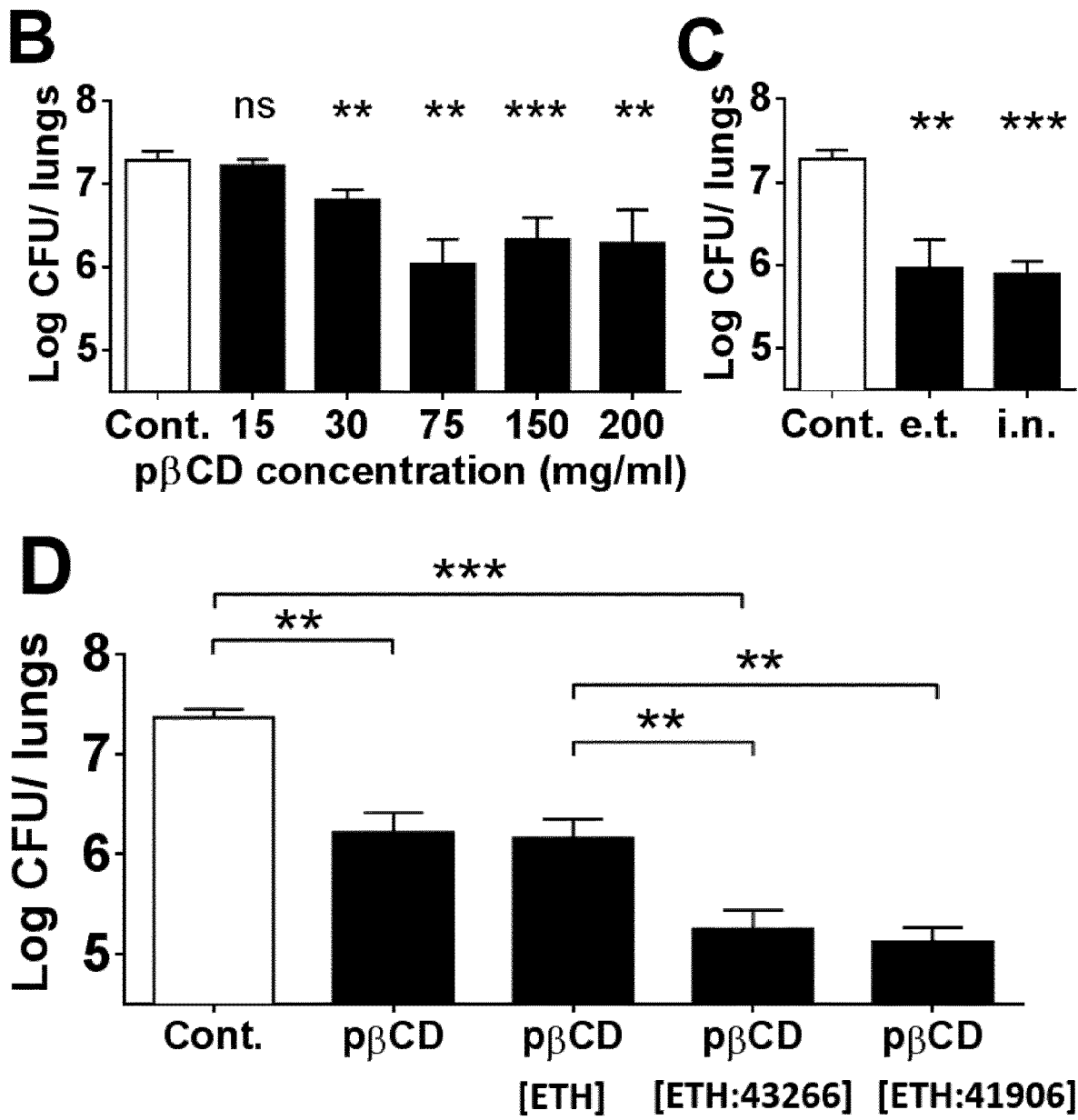
Figures 1B-D

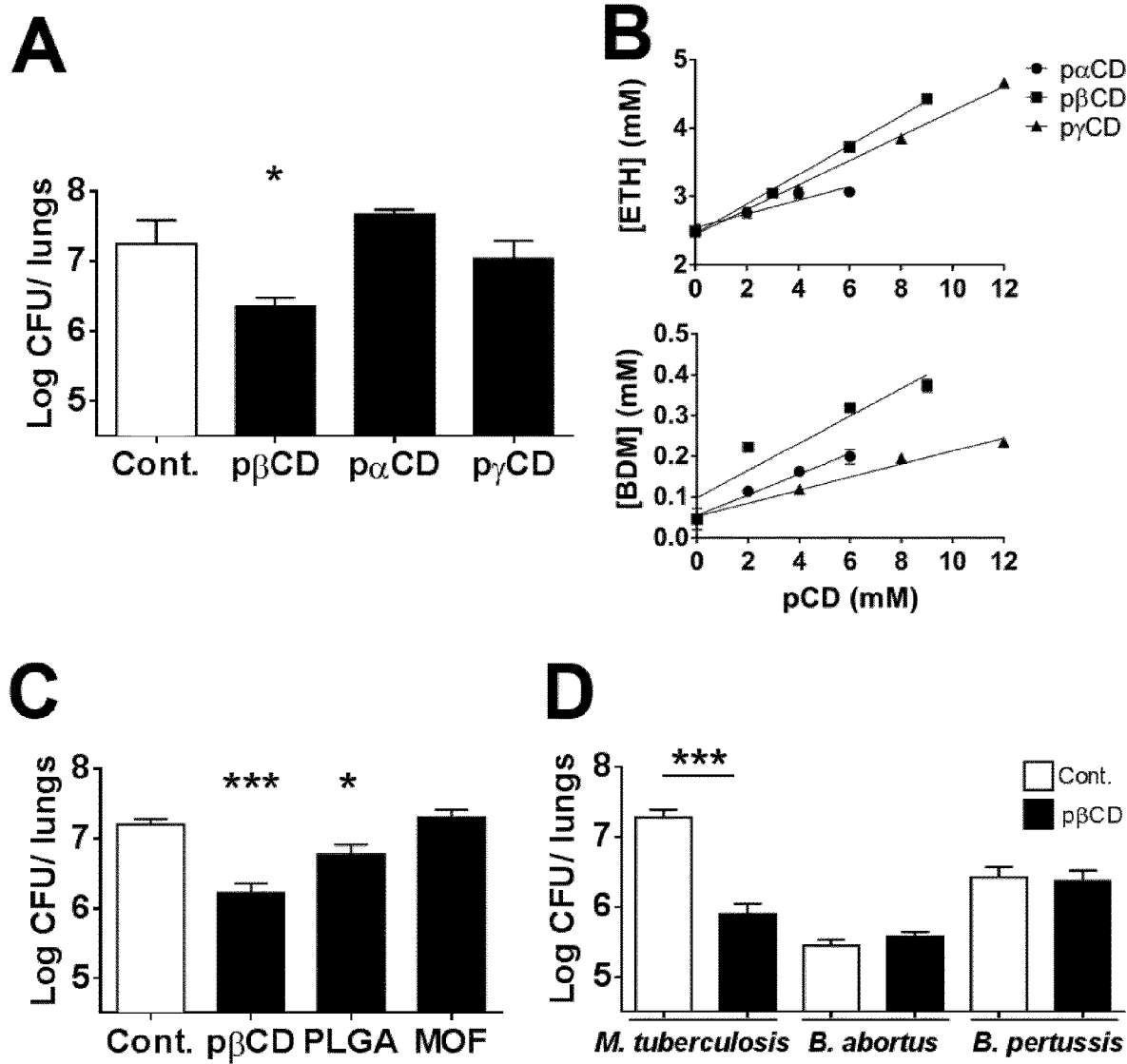
Figure 2A-D

USE OF MATERIALS MADE OF CROSS-LINKED β-CYCLODEXTRINS FOR THE TREATMENT OF TUBERCULOSIS

FIELD OF THE INVENTION

The present invention relates to the use of materials made of cross-linked β-cyclodextrins for the treatment of tuberculosis.

BACKGROUND OF THE INVENTION

Pulmonary tuberculosis (TB), caused by *Mycobacterium tuberculosis* (Mtb) kills 1.6 million HIV-negative and additional 374 000 HIV-positive people in the world, annually[1]. Although TB mortality has decreased over the past 15 years due to implementation of improved TB control programs and strategies, the continuous emergence of multidrug-resistant (MDR) and extensively drug-resistant (XDR) TB remains highly alarming. New means to fight MDR- and XDR-TB are urgently needed. The current regimen for the treatment of drug-sensitive TB relies on a six month-course of four drugs to be taken orally on a daily basis: isoniazid (INH), rifampicin (RIF), ethambutol (EMB) and pyrazinamide (PZA). Lack of patient compliance or individual host variability in drug pharmaco-kinetics both have led to the development of MDR-TB cases. Treatment of MDR-TB requires two years of second-line antibiotics, such as ethionamide (ETH), fluoroquinolones and aminoglycosides, which are less effective and cause more severe side effects and whereby the cure rates remain desperately low.[2]

Mtb is a professional pathogen that initially invades and replicates essentially inside phagocytes such as alveolar and interstitial macrophages. Intracellular Mtb subverts the microbicidal properties of macrophages, which may lead to inefficient containment and development of TB pathology.[3]

Lungs are the major infection site of Mtb transmitted by human-to-human aerogenic spread. In this organ, ingestion and replication of Mtb leads to immune cell recruitment and formation of granulomas, which is a hallmark of the anti-mycobacterial immune response. The granuloma is composed of an organized aggregation of cells including infected and non-infected macrophages, dendritic cells, inflammatory monocytes and neutrophils, as well as natural killers and lymphocytes. To exert their activity, antimyco-bacterial drugs must reach granulomas and express their sterilizing activity within the phagosomes of the innate immune cells in which the bacilli reside.[4] If the bacterial growth is not sufficiently controlled, necrotic tissue lesions can become caseous to form cavities from which Mtb may be disseminated to other parts of the lung parenchyma. This leads to initiation of secondary infectious sites, Mtb release to the airways and thereby transmission to new hosts.

Local administration of anti-TB drugs directly into the lung is an attractive strategy to improve the efficacy of current TB treatment and to reduce systemic side effects. It should also be beneficial in preventing bacterial dissemination and disease establishment by targeting more efficiently infected macrophages thus reducing administered doses.[5] Nanotechnologies as therapeutic tools to fight microbial resistance and especially against tuberculosis have been proposed as an effective approach.[6-10] For example, the use of nanoparticles (NPs) allows the administration of poorly soluble drugs into the lungs.[11-13] Co-encapsulation of ETH together with the Booster of its bioactivation, called Booster (BDM41906)[14] in nanoparticles made of cross-linked poly-β-cyclodextrins (pβCD) was recently described to overcome the drawbacks related to the strong tendency of ETH to crystallize and to the low solubility of the Booster in aqueous media.[13] Interestingly, pβCD allowed for an efficient one-step incorporation of both ETH and Booster by a "green" procedure, which means that no organic solvents were used in the process. Importantly, as we previously described, treatment of Mtb-exposed mice with pβCD loaded with ETH and BDM41906 was shown to lead to a significant decrease of the mycobacterial burden in lungs, similar to that generated by the first line reference drug INH.[13]

SUMMARY OF THE INVENTION

As defined by the claims, the present invention relates to the use of materials made of cross-linked β-cyclodextrins for the treatment of tuberculosis.

DETAILED DESCRIPTION OF THE INVENTION

Multi-drug resistant tuberculosis (TB) is a major public health problem concerning about half a million cases each year. Patients hardly adhere to the current strict treatment consisting of more than 10,000 tablets over a 2-year period. There is a clear need for efficient and better-formulated medications. The inventors have previously shown that nanoparticles made of cross-linked poly-β-cyclodextrins (pβCD) are efficient vehicles for pulmonary delivery of powerful combinations of anti-TB drugs. Here, they report that in addition to be efficient drug carriers, pβCD nanoparticles are endowed with intrinsic antibacterial properties. Indeed, empty pβCD are able to impair *M. tuberculosis* (Mtb) establishment after pulmonary administration in mice. pβCD hamper colonisation of macrophages by Mtb by interfering with lipid rafts, without inducing toxicity. Moreover, pβCD provoke macrophage apoptosis leading to depletion of infected cells, thus creating a lung micro-environment detrimental to Mtb persistence. Taken together, the results suggest that pβCD loaded or not with antibiotics play an antibacterial action by its own and could be used as carrier in drug regimen formulations effective against TB.

Accordingly, the first object of the present invention relates to a method of treating tuberculosis in a patient in need thereof comprising administering to the patient a therapeutically effective amount of materials made of cross-linked β-cyclodextrins, optionally loaded with at least one antibiotic.

As used herein, the term "tuberculosis" or "TB" has its general meaning in the art and refers to the infection caused by the infective agent "*Mycobacterium tuberculosis*" a tubercle *bacillus* bacteria. Tuberculosis is a potentially fatal contagious disease that can affect almost any part of the body but is most frequently an infection of the lungs. *Mycobacterium tuberculosis* is indeed transmitted by airborne droplet nuclei produced when an individual with active disease coughs, speaks, or sneezes. When inhaled, the droplet nuclei reach the alveoli of the lung. In susceptible individuals the organisms may then multiply and spread through lymphatics to the lymph nodes, and through the bloodstream to other sites such as the lung apices, bone marrow, kidneys, and meninges.

In some embodiments, the method of the present invention is particularly suitable for the treatment of pulmonary tuberculosis.

In some embodiments, the method of the present invention is particularly suitable for the treatment of multi-drug resistant tuberculosis. As used herein, the term "multi-drug resistant tuberculosis" refers to tuberculosis wherein the infecting strain is resistant to two or more of "front-line" antibiotics effective in treating tuberculosis. An "antibiotic" refers to a pharmacological agent known and used in the art to treat tuberculosis (e.g. infection by *M. tuberculosis*). Exemplified pharmacological agents used to treat tuberculosis include, but are not limited to amikacin, aminosalicylic acid, capreomycin, cycloserine, ethambutol, ethionamide, isoniazid, kanamycin, pyrazinamide, rifamycins (i.e., rifampin, rifapentine and rifabutin), streptomycin, ofloxacin, ciprofloxacin, clarithromycin, azithromycin and fluoroquinolones. "First-line" or "Front-line" antibiotics used to treat tuberculosis that is not drug resistant include isoniazid, rifampin, ethambutol, streptomycin and pyrazinamide. "Second-line" antibiotics used to treat tuberculosis that has demonstrated drug resistance to one or more "first-line" drugs include ofloxacin, ciprofloxacin, ethionamide, aminosalicylic acid, cycloserine, amikacin, kanamycin and capreomycin.

As used herein, "treatment" or "treating" is an approach for obtaining beneficial or desired results including clinical results. For purposes of this invention, beneficial or desired clinical results include, but are not limited to, one or more of the following: alleviating one or more symptoms resulting from the disease, diminishing the extent of the disease, stabilizing the disease (e.g., preventing or delaying the worsening of the disease), preventing or delaying the spread (e.g., metastasis) of the disease, preventing or delaying the recurrence of the disease, delay or slowing the progression of the disease, ameliorating the disease state, providing a remission (partial or total) of the disease, decreasing the dose of one or more other medications required to treat the disease, delaying the progression of the disease, increasing the quality of life, and/or prolonging survival. Also encompassed by "treatment" is a reduction of pathological consequence of cancer. The methods of the present invention contemplate any one or more of these aspects of treatment. In one embodiment, the terms "treating" or "treatment" refers to both therapeutic treatment and prophylactic or preventative measures; wherein the object is to prevent or slow down (lessen) the targeted disease. Therefore, in one embodiment, those in need of treatment may include those already with the disorder as well as those prone to have the disorder or those in whom the disorder is to be prevented.

As used herein, the term "material" refers to any material that can be made by the polymerisation or cross-linking of β-cyclodextrin.

As used herein, the term "cyclodextrin" has its general meaning in the art and refers to family of cyclic oligosaccharides, consisting of a macrocyclic ring of glucose subunits joined by α-1,4 glycosidic bonds. Cyclodextrins are typically produced from starch by enzymatic conversion. The term "α-cyclodextrin" indicates that the cyclodextrin has 6 sugar moieties in its cyclic structure, the term "β-cyclodextrin" or "β-CD" indicates that the cyclodextrin has 7 sugar moieties in its cyclic structure, and the term "γ-cyclodextrin" indicates that the cyclodextrin has 8 sugar moieties in its cyclic structure.

In some embodiments, the materials are nanoparticles. As used herein, the term "nanoparticles" is meant to refer to particles having an average size (such as a diameter, for spherical or nearly spherical nanoparticles) of about 10 nanometers (nm) in size or less. The "diameter" is typically defined as the "crystalline diameter" or as the "hydrodynamic diameter". The crystalline size (or "diameter" if applicable) of a population of nanoparticles can be determined herein by transmission electron microscopy whereas the hydrodynamic size related to surface functionalization is measured by dynamic laser light scattering (DLS), in a physiological medium, for example NaCl 0.9%, NaCl 0.9%/Glucose 5%, or other buffer media at a physiological pH, used for biological evaluation as well as in vitro and in vivo experiments.

As used herein, the term "about," as applied to one or more values of interest, refers to a value that is similar to a stated reference value. In some embodiments, the term "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction of the stated reference value unless otherwise stated or otherwise evident from the context.

Even though spherical nanoparticles are particularly considered in the context of the invention, it will be understood herein that the term "nanoparticle" is not meant to refer exclusively to one type of shape. Accordingly, this term may also encompass other shapes, selected from: spherical nanoparticles, rod-shaped nanoparticles, vesicle-shaped nanoparticles, and S-shaped worm-like particles as well as other morphologies such as nanoflower, raspberry, and core-shell nanoparticles.

In some embodiments, the nanoparticles of the present invention are prepared by polymerization of β-CD with epichlorohydrin in alkaline medium as described in the EXAMPLE and as described in Gref, R. et al. *Journal of controlled release: official journal of the Controlled Release Society* 2006, 111 (3), 316-24, and Othman, M et al. *J Colloid Interface Sci* 2011, 354 (2), 517-27.

In some embodiments, the nanoparticles of the present invention are loaded with at least one antibiotic selected from the group consisting of fluoroquinolones (e.g. ciprofloxacin (Cipro), gemifloxacin (Factive), levofloxacin (Levaquin), moxifloxacin (Avelox), norfloxacin (Noroxin), and ofloxacin (Floxin)) and aminoglycosides (e. g. Amikacin, Gentamicin, Kanamycin, Neomycin, Streptomycin, Tobramycin).

In some embodiments, the nanoparticles of the present invention are loaded with ethionamide (ETH) (i.e. 2-ethylpyridine-4-carbothioamide) but do not comprise a booster such as BDM43266 and BDM41906. Accordingly the present specification excludes from the scope of the invention the nanoparticles as described in Costa-Gouveia, J. et al. *Sci Rep.* 2017, 7, 5390.

In some embodiments, the nanoparticles of the present invention are not loaded with an antibiotic.

By a "therapeutically effective amount" is meant a sufficient amount of material (e.g. nanoparticles) of the present invention for the treatment of tuberculosis at a reasonable benefit/risk ratio applicable to any medical treatment. It will be understood that the total daily usage of the compounds and compositions of the present invention will be decided by the attending physician within the scope of sound medical judgment. The specific therapeutically effective dose level for any particular subject will depend upon a variety of factors including the disorder being treated and the severity of the disorder; activity of the specific compound employed; the specific composition employed, the age, body weight, general health, sex and diet of the subject; the time of administration, route of administration, and rate of excretion of the specific compound employed; the duration of the treatment; drugs used in combination or coincidental with the specific polypeptide employed; and like factors well known in the medical arts. For example, it is well within the skill of the art to start doses of the compound at levels lower than those required to achieve the desired therapeutic effect and to gradually increase the dosage until the desired effect is achieved. However, the daily dosage of the products may be varied over a wide range from 0.01 to 1,000 mg per adult per day.

Typically, the material (e.g. nanoparticles) are administered in the form of a pharmaceutical composition.

In some embodiments, the pharmaceutical compositions of the present invention are formulated for intranasal or pulmonary delivery and may therefore be administered by any suitable methods used for delivery of the nanoparticles to the lungs. For example, the composition of the present invention may be in the form of aerosol compositions, powders, sprays, solutions, suspensions, drops, an insufflation powder or nasal powder. Such compositions may be administered by any conventional means, for example using a metered dose inhaler (MDI), a dry powder inhaler (DPI), a nebulizer, an insufflator, a powder sprayer or a powder inhaler.

In some embodiments, the pharmaceutical composition is presented in the form of a powder dosage form for inhalation and may be administered using a dry powder inhaler, a nasal insufflator, a nasal powder sprayer or a powder inhaler. Typically, the pharmaceutical composition is administered using a nasal insufflator, a nasal powder sprayer or a powder inhaler. Pharmaceutically acceptable excipients suitable for use with pharmaceutical compositions for intranasal delivery include a carrier, a solvent, a vehicle, a thickening agent, a tonicity agent, a pH regulator, a chelating agent, or combinations thereof.

In some embodiments, the pharmaceutical compositions of the present invention are in a form suitable for pulmonary delivery using a metered dose inhaler (MDI), for example, in the form of an aerosol composition. Such compositions may comprise one or more pharmaceutically acceptable excipients, in particular selected from the group of an HFC/HFA propellant, a co-solvent, a bulking agent, a non-volatile component, a buffer/pH adjusting agent, a surfactant, a preservative, a complexing agent, or combinations thereof. Suitable propellants are those which, when mixed with the solvent(s), form a homogeneous propellant system in which a therapeutically effective amount of the medicament can be dissolved. The HFC/HFA propellant must be toxicologically safe and must have a vapor pressure which is suitable to enable the medicament to be administered via a pressurized MDI. According to the present invention, the HFC/IFA propellants may comprise, one or more of 1,1,1,2-tetrafluoroethane (HFA-134(a)) and 1,1,1,2,3,3,3,-heptafluoropropane (HFA-227), HFC-32 (difluoromethane), HFC-143(a) (1,1,1-trifluoroethane), HFC-134 (1,1,2,2-tetrafluoroethane), and HFC-152a (1,1-difluoroethane) or combinations thereof and such other propellants which may be known to the person having a skill in the art.

In some embodiments, the pharmaceutical compositions of the present invention may be in a form suitable for intranasal delivery by nebulization. Nebulization therapy has an advantage over other inhalation therapies, since it is easy to use and does not require co-ordination or much effort. It also works much more rapidly than medicines taken by mouth. Such compositions may comprise suitable excipients such as one or more, but not limited to, tonicity agents, pH regulators, and chelating agents in a suitable vehicle.

The pharmaceutical composition according to the present invention may be included in one or more suitable containers provided with means enabling the application of the contained formulation to the lungs. For instance, where the pharmaceutical compositions of the invention are in the form of a powder for inhalation and are intended to be administered by an insufflator or powder sprayers, the prefilled powder may be contained in a capsule, straw, tube or syringe and the like. Insufflators, powder sprayers and powder inhalers are devices for intranasal delivery of the pharmaceutical composition of the present invention, and which may include single dose or multi-dose insufflators or powder sprayers such as, but not limited to, TriVair™ (unit-dose dry powder inhaler), OptiNose (breath-powered nasal delivery), Fit-lizer™ (multi use, single use), UniDose DP, SoluVent™, Monopowder® and the like. Where the pharmaceutical compositions of the invention and are intended to be administered by a DPI, it may be encapsulated in capsules of gelatin or HPMC, or in blisters. The dry powder may be contained as a reservoir either in a single dose or multi-dose dry powder inhalation device. Alternatively, the powder for inhalation may be suspended in a suitable liquid vehicle and packed in an aerosol container along with suitable propellants or mixtures thereof. Alternatively, the powder for inhalation may be dispersed in a suitable gas stream to form an aerosol composition. The pharmaceutical compositions of the invention for pulmonary delivery in the form of an aerosol composition for administration using an MDI, may be packed in plain aluminium cans or SS (stainless steel) cans or any such cans suitable for MDI delivery. Some aerosol drugs tend to adhere to the inner surfaces, i.e., walls of the cans and valves, of the MDI. This can lead to the patient getting significantly less than the prescribed amount of the active agent upon each activation of the MDI. Such cans may be suitably treated to avoid any adherence of the active on the walls thereof using techniques known in the art, for example coating the inner surface of the container with a suitable polymer can reduce this adhesion problem. Suitable coatings include fluorocarbon copolymers such as FEP-PES (fluorinated ethylene propylene and polyethersulphone) and PFA-PES (perfluoroalkoxyalkane and polyethersulphone), epoxy and ethylene. Alternatively, the inner surfaces of the cans may be anodized, plasma treated or plasma coated. Where the pharmaceutical compositions of the invention are in the form of nasal sprays and nasal drops for administration into the nasal passages it may be done by means of a dropper (or pipette) that includes a glass, plastic or metal dispensing tube. Fine droplets and sprays can be provided by an intranasal pump dispenser or squeeze bottle as well known in the art.

The invention will be further illustrated by the following figures and examples. However, these examples and figures should not be interpreted in any way as limiting the scope of the present invention.

FIGURES

FIG. 1. Assessment of the effect of pβCD on the lung mycobacterial load in Mtb-challenged mice.

(A) Experimental design; BALB/c mice were anesthetized and i.n. inoculated with $10^5$ CFU of Mtb H37Rv strain contained in 20 µl of PBS. At days 7, 9, 11, 14, 16 and 18 post challenge, mice received administrations of 50 µl of pβCD of various concentrations via the e.t. route by use of a Microsprayer® device that generate aerosolization directly into the lungs. At day 21 post challenge, lungs were harvested for bacterial burden determination by CFU counting. (B) Mice received 6 inoculations of 50 µl of pβCD preparations at defined concentrations by the e.t. route before pulmonary bacterial load was evaluated at day 21 post challenge. (C) Comparison of the impact of pβCD (6×50 µl at 150 mg/ml) on Mtb pulmonary load administrated by the i.n. route or by the e.t. route after i.n. infection. (D) Comparison of the effect of the administration of unloaded pβCD and pβCD loaded with ETH alone, [ETH:BDM43266] or [ETH:BDM41906[(6×50 µl at 150 mg/ml of pβCD). Data are presented as mean±SEM and are representative of at least two independent experiments.  and * denote p<0.01 and p<0.001, respectively.

FIG. 2. Effect of other types of nanoparticles on Mtb infection and effect of pβCD on other bacterial pulmonary diseases in mice.

(A, C) BALB/c mice were infected via i.n. route with $10^5$ Mtb H37Rv (20 µl of PBS). At days 7, 9, 11, 14, 16 and 18 mice received pulmonary administration of nanoparticles in a volume of 50 µl (pαCD, pβCD or pγCD 150 mg/ml, PLGA 15 mg/ml, MOF 5 mg/ml). 21 days post infection, lungs were harvested for bacterial burden evaluation by CFU counting. (B) Solubility properties of ETH and BDM43266 using pαCD, pβCD and pγCD. (D) Mice were i.n. infected with the indicated bacteria. At defined days post infection, mice received i.n. administration of pβCD (150 mg/ml, 50 µl) before CFU counting. Data are presented as mean±SEM and are representative of two independent experiments. * and *** denote p<0.05 and p<0.001, respectively.

EXAMPLE

Methods
Nanoparticle Preparation:

β-Cyclodextrin (βCD) was kindly supplied by Roquette, Lestrem, France. pβCD nanoparticles of around 10 nm were produced as previously described[50, 51] by cross-linking βCD under strongly alkaline conditions with epichlorohydrin (EP). Briefly, 100 g of anhydrous βCD was solubilized overnight in 160 ml of NaOH 33% w/w solution. After adding 81.52 g of EP, the reaction was stopped in the vicinity of the gelation point. The pβCD, recovered by ultrafiltration followed by freeze-drying, contained 70% w/w βCD, as determined by $^1$H NMR spectroscopy. Using the same cross-linking method, αCD and γCD (Sigma-Aldrich, Saint Quentin Fallavier, France) were cross-linked leading to the formation of pαCD and pγCD, respectively. These materials had similar properties except their CD content which was 61% w/w and 82% w/w for pαCD and pγCD, respectively.

Nanoparticle preparations were purified using High Capacity Endotoxin-free columns (ThermoFisher). For both cellular and in vivo experiments, pβCD were dispersed in water. For the various cellular assays, nanoparticles were harvested in microplates and manual dilutions of the mother solution in a final volume of 100 µl were performed in sterile MilliQ water in a 384 deep well "diamond plate" (Axygen) in order to obtain a dose-response curve. Previously, 5 µl of each concentration of the pβCD were dispensed in 384-well clear-bottom polystyrene assay plates (Greiner Bio-One). Water was used as negative control (Cont). Rhod-pβCD were synthesised according to a previously reported method.[52]

Nanoparticles of porous Metal-Organic Frameworks (nanoMOF)—MIL-100(Fe) (MIL stands for Material of Institut Lavoisier) were synthesized by microwave assisted hydrothermal reaction as previously described.[53] A mixture containing the iron source (iron (III) chloride hexahydrate) (6.0 mmol) and the organic bridging ligand (1,3,5-benzene-tricarboxylic acid) (4.02 mmol) was heated in 20 ml of deionized water, 6 min at 130° C. under stirring. The reaction was carried out in a Pyrex reactor at a power of 800 W (Mars-5, CEM, US). The crystalline iron-trimesate nanoMOFs were recovered by centrifugation (15 min, 10,000×g) and purified by washing six times with absolute ethanol. The nanoparticles had a mean diameter of 225 nm and a specific BET surface of 1650 m$^2$/g, in agreement with previously reported data.[46] For in vivo administration, nanoMOF were administrated dispersed in water at a concentration of 5 mg/ml.

Poly (D,L-lactide-co-glycolide) (PLGA 50:50 acid terminated (MW: 5-20 KDa, 10P019) was kindly provided by PCAS (Expansorb, Aramon, France). Nanoparticles were produced by an emulsification method as described in our previous study.[13] Their mean diameter was 180 nm. For in vivo experiments, PLGA were administrated at a concentration of 15 mg/ml.

Ethionamide and Booster Co-Incorporation and Phase Solubility Studies:

A series of CDs aqueous solutions (0, 3, 6, and 9 mM for αCD, βCD, pβCD and γCD; 0, 2, 5, and 7 mM for pαCD; and 0, 4, 8, 12 mM for pγCD) were introduced in vials containing excess amounts of ETH and Booster, respectively. The dispersions, accurately protected from light, were kept under shaking for three days for drug:CD complexation to reach equilibrium. Then, the excess (not dissolved) drugs were removed by centrifugation to obtain saturated ETH or Booster loaded systems. Drugs in the supernatants were extracted by adding equals volumes of a DMSO/Acetonitrile (1:10 v/v) mixture, followed by centrifugation at 17,000 g for 20 min to remove the precipitated CDs or NPs. Drug concentration in the clear supernatants was assessed by RP-HPLC as previously described.[18] An Agilent IPLC system (Agilent 1100 Series) equipped with a $C_{18}$ column (Kinetex 5 µm, 100A, Phenomenex) and an UV detector at 280 nm was used. The eluants were: solvent A 0.1% trifluoroacetic acid (TFA) in MilliQ water and solvent B 0.1% TFA in acetonitrile; 0-2 min: 0%-20% B, 2-6 min: 20%-45% B, 6-10 min: 45%-75% B, 10-15 min: 75%-0%. The flow rate was 1.0 mL/min at room temperature.

Phase solubility diagrams were obtained by plotting the apparent solubility of ETH or Booster against the equivalent molar CDs' concentrations. For pCDs, the concentrations were calculated taking into account their CD content determined by NMR. Assuming an 1:1 stoichiometry of the binding interactions, the binding constants ($K_{1:1}$) were calculated from the linear regression curve of solubility diagrams, according to the following equation[43]:

$$K_{1:1} = \frac{\text{slope}}{S_0 \cdot (1 - \text{slope})}$$

Where $S_0$ is drug solubility in water.

For in vitro and in vivo studies, ETH and Boosters (BDM43266 and BDM419066) were encapsulated in pCDs without using any organic solvent, by mixing overnight 150 mg pCDs suspensions with the drug powders, 3 mg of ETH and 3 mg of Booster per ml of water as previously described.[18]

Mice:

6-week old Balb/C female mice and C57BL/6 female mice were purchased from Janvier (Le Genest-Saint-Isle, France) and were maintained in the animal house facility of the Pasteur Institute of Lille, France (Agreement B59-350009). The project received ethical approval by French Committee on Animal Experimentation and the Ministry of Education and Research (00579.01 approved on Dec. 2, 2015 and APAFIS #10232-2017061411305485 v6 approved on September 2018) and all experiments were performed in accordance with relevant guidelines and regulations.

Murine Bone-Marrow Macrophages (BMDM) and Dendritic Cells (BMDC):

Murine bone-marrow progenitors were obtained by sampling tibias and femur bones from 7 to 11 week-old C57BL/6 mice. BMDM and BMDC were obtained by seeding $10^7$ bone marrow cells in 75 cm² flasks in RPMI 1640 Glutamax medium (Gibco) supplemented with 10% heat-inactivated Fetal Bovine Serum (FBS) (Gibco) and 10% L929-conditioned medium containing Macrophage Colony-Stimulating Factor (M-CSF) or Granulocyte-Macrophage Colony-Stimulating Factor (GM-CSF). After 7 days incubation at 37° C. under 5% $CO_2$, BMDM were rinsed with D-PBS and harvested with Versene (Gibco) to be used for the following assays.

CTB-FITC Staining and Apoptosis Assay:

$10^4$ BMDM were seeded in 384-well plates in the presence of various concentrations of pβCD diluted in 50 μl RPMI containing 10% FBS and M-CSF. After an overnight incubation with pβCD, BMDM were fixed with 10% neutral buffered Formalin solution (HT5014, Sigma-Aldrich) for 30 min and then labelled with CTB (Cholera Toxin Subunit-Beta)-FITC (C1655, Sigma-Aldrich) and DAPI at 10 μg/ml in D-PBS for 10 minutes at RT. The GFP-certified Apoptosis/Necrosis detection kit (Enzo, ENZ-51002) was used to monitor cell death. Confocal images were acquired using an Opera automated confocal microscope and image quantification was performed using Columbus software.

Mtb Entry or Replication Assay:

Recombinant Mtb H37Rv expressing the red fluorescent protein DsRed (H37Rv-MRF1)[54] was cultured at 37° C. for two weeks in Middlebrook 7H9 medium (Difco) supplemented with 10% Middlebrook oleic acid-albumin-dextrose-catalase (OADC, Difco), 0.5% glycerol (Sigma-Aldrich), 0.05% Tween 80 (Sigma-Aldrich) and 20 μg/ml kanamycin (Invitrogen). Mycobacteria were washed three times with Dulbecco's Phosphate-Buffered Saline (DPBS free of $MgCl_2$ and $CaCl_2$, Gibco) and re-suspended in RPMI-1640 Glutamax medium (Difco) containing 10% heat-inactivated Fetal Bovine Serum (FBS, Life Technologies). Clumped mycobacteria were removed by centrifugation at 700 rpm for 2 min and homogeneous supernatants were used for infection. Bacterial titre was determined by measuring the red fluorescence on a Victor Multilabel Counter (Perkin Elmer) and a standard titration curve. The bacterial suspension was diluted at $2 \times 10^6$ CFU per ml in RPMI 1640 supplemented with 10% FBS (RPMI-FBS) before being added to BMDM for infection.

For the Mtb entry assay, bacteria were added to BMDM that had been incubated for 2 or 16 hours with various dilutions of pβCD. At 2 hours post infection, cells were fixed with 10% neutral buffered Formalin solution (HT5014, Sigma-Aldrich) for 30 min and then labelled with DAPI at 10 μg/ml in D-PBS for 10 minutes at RT for image-based analysis.

For the Mtb replication assay, BMDM were infected during 24 hours (MOI 2) before being incubated with various concentrations of pβCD until day 5 post infection. Then, cells were fixed with 10% neutral buffered Formalin solution (HT5014, Sigma-Aldrich) for 30 min and then labelled with DAPI at 10 μg/ml in D-PBS for 10 minutes at RT for image-based analysis.

Image Acquisition and Image-Based Analysis:

For intracellular assays, image acquisition of 384-well plates was performed on an automated fluorescent confocal microscope (InCell6000, GE Healthcare), using a 20× objective. The confocal microscope was equipped with 405, 488, 561 and 640 nm excitation lasers. A series of six fields was taken per well and each one was analysed using the image-analysis software Columbus system (version 2.5.1, PerkinElmer). Cells (nuclei and cytoplasm) were detected by an intensity detection algorithm applied on the DAPI channel. A spot detection algorithm based on the RFP channel was applied for the detection of Mtb-MRF1 in cells and the bacterial intensity and area in pixels were measured. Images were analysed to determine the percentage of infected cells.

Genotoxicity Assay:

THP1 (ATCC® TIB-202™) cells were incubated for 4 hours in complete medium with different concentrations of pCDs suspensions in sterile water or positive controls as described.[55] For the in vitro micronucleus assay, cells were washed and reincubated for a 1.5-2 cell cycle recovery period. At the end of this recovery period, cells were washed and trypsinized. After centrifugation at 1000 rpm (95×g) for 6 min, supernatant was discarded and cells were treated with a hypotonic solution (culture medium diluted 1:1 in distilled water). After the hypotonic shock, a pre-fixation step was performed by adding cold Carnoy's fixative (methanol/glacial acetic acid, 3:1 v/v). Cells were then centrifuged and suspended in Carnoy's fixative for 10 min. After another centrifugation, cells were resuspended and spread on duplicate glass slides. Slides were air-dried at least overnight and stained for 10 min with 4% v/v Giemsa in water. Micronuclei, identified according to recommended criteria, were scored at 500× magnification in 1000 intact mononucleated cells per slide. The comet assay was performed under alkaline conditions (pH>13). At the end of the 4 hours treatment, THP1 cells were washed and trypsinized. Trypsin was inactivated by adding complete medium. Viable cells were counted using Trypan blue exclusion and $8 \times 10^4$ viable cells were mixed with 0.5% w/v LMPA kept at 37° C. Cells embedded in LMPA were spread on to regular precoated microscopic slides (1.5% and 0.8% w/v normal melting point agarose). All the following steps were sheltered from daylight to prevent the occurrence of additional DNA damage. Slides were immersed for at least 1 h at 4° C. in a cold lysing solution (2.5 M NaCl, 100 mM EDTA, 10 mM Trizma Base, pH 10, supplemented with 1% v/v Triton X-100 and 10% v/v dimethyl sulfoxide). All the slides were then placed in a horizontal tank filled with fresh electrophoresis solution (1 mM EDTA and 300 mM NaOH, pH>13) for 20 min to allow DNA unwinding and expression of strand breaks and alkali-labile sites. Next, electrophoresis was performed for 20 min using an electric current of 0.7 V cm−1. Slides were then placed for 10 min in a neutralization solution (0.4 M Trizma base, pH 7.5) and gels were dehydrated by immersion in absolute ethanol for 5 min. Finally, slides were air-dried and stored at room temperature. Slides were independently coded and analyzed after addition of propidium iodide (20 μg/ml) and a coverslip on each slide. Slides were then examined at 250× magnification using a fluorescence microscope (Leica Microscopy and Scientific Instruments Group, Heerbrugg, Switzerland) equipped with an excitation filter of 515-560 nm and a 590 nm barrier filter, connected through a gated CCD camera to Comet Image Analysis System software, version 4.0 (Perceptive Instruments Ltd., Haverhill, UK). One hundred randomly selected cells were scored on each slide, corresponding to 200 cells.

Dendritic Cell Maturation Assay:

BMDC were incubated with 1 or 2 mg/ml of pβCD overnight. *M. bovis* BCG1173P2, a strong inducer of DC maturation was used as positive control. Cells were washed and incubated with anti-CD16/CD32 (2.4G2 mAb, BD Pharmingen) during 20 minutes followed by surface staining during 20 minutes incubation with appropriate dilutions of PE-Cy7-anti-CD11 in combination with FITC-conjugated anti-CD40 (HM40-3, SONY), anti-CD80 (B7-1) (16-10A1 Biolegend), anti-CD86 (B7-2) (P03, SONY), anti-MHCII (I-A/I-E) (MS/114.15.2, eBioscience), anti-MHC-I ($H-2k^b$) (AF6-88-5-5-3, eBioscience) or the control Ig isotype antibodies. The stained cells were washed twice in PBS containing 3% FBS and 0.1% $NaN_3$ and then fixed with 4% paraformaldehyde during 18 hours at 4° C. prior to sample acquisition by a CytoFlex cytometer system (Beckman Coulter). As a functional DC maturation assay, TNF-α and IL-1β were quantified by ELISA in the culture supernatants of the same cultures, as described.[56]

Effect of pfCD on Mtb-Infected Mice:

8-week-old BALB/c mice (4 mice per group) were inoculated with Mtb H37Rv via the i.n. route ($10^5$ CFU/20 µl) as described.[13] Briefly, 50 µl of water containing pβCD (or PBS alone as control) were administered to mice via the e.t. route using a Microsprayer® (MicroSprayer® Aerosolizer—Model IA-1C-M and FMJ-250 High Pressure Syringe, Penn Century Inc., Wyndmoor, PA) or via the i.n. route. Administrations were performed on day 7, 9, 11, 14, 16, 18. At day 21, mice were euthanized and lungs were homogenized with MM300 bead beater (Retsch) and tenfold serial dilutions were plated onto 7H11 agar plates supplemented with 10% OADC. CFUs were determined after a three-week growth at 37° C.

Effect of pβCD on *B. abortus*-Infected Mice:

As described,[57] 8-week-old BALB/c mice were i.n. infected by *B. abortus* 2308 ($10^5$ CFU in 30 µl). Cultures were grown overnight with shaking at 37° C. in 2YT medium (Luria-Bertani broth with double quantity of yeast extract) and were washed twice in RPMI 1640 (Gibco Laboratories) (3,500×g, 10 min) before inoculation of the mice. The mice were anesthetized with a cocktail of xylazine (9 mg/kg) and ketamine (36 mg/kg) in PBS before being inoculated. The infectious doses were validated by plating serial dilutions of the inoculate. i.n. administrations of pβCD were performed on day 7, 9, 11, 14, 16, 18. The mice were sacrificed 21 days after infection by cervical dislocation. Immediately after sacrifice, lungs were collected for bacterial counts. Organs were crushed and transferred to PBS/ 0.1% X-100 Triton (Sigma-Aldrich). We performed successive serial dilutions in RPMI and plated them onto 2YT medium. The CFUs were determined after 5 days of culture at 37° C.

pβCD effect on *B. pertussis*-infected mice:

Groups of 4-5 BALB/c mice (8-week-old) were sedated with pentobarbital (CEVA Santé Animale—La Ballastiere, France) and i.n. infected with 20 µl of PBS containing $10^6$ CFU of *B. pertussis*. The *B. pertussis* strain used was streptomycin-resistant BPSM and was grown on Bordet-Gengou agar (Difco Laboratories) supplemented with 1% glycerol, 20% defibrinated sheep blood and 100 µg/ml streptomycin at 37° C. as described.[58] After growth, the bacteria were collected and resuspended in PBS at the desired density. i.n. administrations of pβCD were performed on day 1, 3, 6. 7 days post-infection, lungs were harvested, homogenized in PBS and plated in serial dilutions onto BG-Blood agar for CFU quantification after 5 days of incubation at 37° C.

Flow Cytometry on Lungs:

Harvested organs were cut into small pieces and incubated for 1 hour at 37° C. with a mix of DNAse I (100 µg/ml, Sigma-Aldrich) and collagenase D (400 U/ml, Roche). Lung cells were washed and filtered before being incubated with saturating doses of purified 2.4G2 (anti-mouse Fc receptor, ATCC) in 200 µl PBS 0.2% BSA 0.02% $NaN_3$ (FACS buffer) for 20 minutes at 4° C. to prevent antibody binding on the Fc receptor. Various fluorescent mAb combinations in FACS buffer were used to stain $3-5\times10^6$ cells. Acquisitions were done on FACScanto II cytofluorometer (Becton Dickinson) with the following mAbs: Fluorescein (FITC)-coupled anti-CD3 (145-2C11, BD Biosciences), FITC-coupled anti-CD11c (HL3, Thermofisher), FITC-coupled anti LY6G (1A8, BD Biosciences), Phycoerythrine (PE)-coupled anti-SiglecF (E50-2440, BD Biosciences), PE-coupled anti-MHCII (M5, BD Biosciences), PE-coupled anti CD11b (M1/70, BD Biosciences), Allophycocyanin (APC)-coupled anti-F4/80 (BM8, BD Biosciences), APC-coupled anti-B220 (RA3-6B2, BD Biosciences), APC-coupled anti-CD11c (HL3, BD Biosciences), Brillant violet 421 (BV421)-coupled anti SiglecF (E50-2440, BD Biosciences), BV421-coupled anti-MHCII (M5, BD Biosciences and fixable viability dye aqua (ThermoFisher) was used to gate viable cells.

Fluorescent Histology on Infected Lung and Apoptosis Staining:

Mice were anesthetized and via i.n. administrated with 50 µl of NucView 488 caspase-3 substrate (Ozyme BTM10402) diluted in PBS (250×). 1 hour after injection, mice were euthanized to harvest lungs for histological analysis. In details, lungs were fixed overnight at 4° C. with 10% neutral buffered Formalin solution (HT5014, Sigma-Aldrich), washed in PBS, and incubated overnight at RT in a 20% PBS-sucrose solution under a vacuum. Tissues were then embedded in the Tissue-Tek OCT compound (Sakura), frozen in liquid nitrogen, and cryostat sections (10 µm) were prepared. For staining, tissue sections were rehydrated in PBS and incubated in a PBS solution containing 1% blocking reagent (Boeringer) (PBS-BR 1%) and DAPI nucleic acid stain for 20 min. Slides were mounted in Fluoro-Gel medium (Electron Microscopy Sciences, Hatfield, PA, USA). Labeled tissue sections were visualized with an Axiovert M200 inverted microscope (Zeiss, Iena, Germany) equipped with a high-resolution mono-chrome camera (AxioCam HR, Zeiss). At least three slides were analyzed per organ from three different animals and the results are representative of two independent experiments.

Statistical Analysis:

A Mann-Whitney test provided by the GraphPad Prism software. Each group of mice was compared to the control group. Comparison of groups two-by-two was performed and the results are displayed when required. Values of $p<0.05$ were considered significant. *,  and * denote $p<0.05$, $p<0.01$ and $p<0.001$, respectively.

Results

Intrinsic Properties of pβCD Against Mtb Growth In Vivo

To study the possible impact of unloaded pβCD on the control of Mtb growth in vivo, we used a mouse model of acute Mtb infection. BALB/c mice (n=4/group) were inoculated with $10^5$ CFU/mouse of Mtb H37Rv via the intranasal (i.n.) route (FIG. 1A). The i.n. route of infection was chosen because it is currently widely used[15] and was approved by our animal ethics committee. Mice were then left for 7 days to allow a 1-log increase of Mtb load in the lungs. From day 7 on, and every second day, groups of mice received via the endotracheal route (e.t.), by use of a Microsprayer device,[13]

50 µl/mouse of diverse concentrations of pβCD, ranging from 15 to 200 mg/ml. These doses are equivalent to 30 to 400 mg/kg of body weight. Compared to untreated mice, on day 21 post challenge, the animals that had received pβCD displayed decreased pulmonary mycobacterial load by one-log for all concentrations ≥30 mg/ml (p<0.01) (FIG. 1B). Therefore, it seems that pβCD alone had an intrinsic antimycobacterial effect in vivo.

We next examined whether the route of administration had an impact on this activity. The antimycobacterial effect of the same pβCD dose (50 µl of 150 mg/ml) was compared between the e.t. and i.n. routes, using the same regimen as detailed in FIG. 1A. A similar decrease in mycobacterial load was detected for both delivery routes by comparison with untreated controls, showing that the two routes of administration can both be equivalently used for further studies (FIG. 1C).

We then determined whether the intrinsic antimycobacterial activity of pβCD could synergize with that of the combination of anti-TB drugs when given directly into the lungs. To this end, we investigated the administration of pβCD loaded with both ETH and Booster. Briefly, ETH is a pro-drug that requires bioactivation, mediated by the bacterial mono-oxygenase EthA. This enzyme is under the control of the repressor EthR.[16] Booster molecules induce conformational changes in EthR, resulting in the inhibition of its repressor activity and thereby an enhancement of ETH activity.[14] As previously described, BDM43266, which has been optimized through fragment screening and structure-based design, allows an increase by 10-fold of the activity of ETH against Mtb growth in vitro.[17] BDM43266 was thus co-loaded with ETH into pβCD using the previously described conditions of encapsulation.[18] Briefly, powders of the two lipophilic drugs were mixed with suspensions of pβCD at 150 mg/ml overnight resulting in their spontaneous incorporation in the hydrophobic cavities of the pβCD. This method has the advantage of avoiding the use of organic solvents. Also, the drugs were incorporated at the molecular state and did not crystallize upon storage, which is usually an issue with ETH alone.

Six administrations of pβCD loaded with ETH alone via the e.t. route induced a decrease of the bacterial load similarly to that upon administration of pβCD alone showing that, as expected, delivery ETH at this low concentration had no antibacterial properties (FIG. 1D). Moreover, the administration of pβCD co-loaded with both drugs ETH and BDM43266 ([ETH:43266]) in Mtb-challenged mice led to a significant decrease (p<0.05) of the pulmonary bacterial load by 1 log, compared to the group that received ETH only. These results first showed that BDM43266 had an effective boosting on ETH. Second, pβCD were able to deliver sufficient amounts of ETH and BDM43266 in vivo. We next compared the boosting efficacy of BDM43266 with that of BDM41906, which we previously reported. No difference was observed concerning the boosting efficacy between BDM41906 and BDM43266. We observed that both Boosters exerted similar effects in our model of infection suggesting that they should be considered as potent drug candidates for future anti-TB investigations.

The antibacterial activity of nanoparticles is an intense area of research,[19-21] but to the best of our knowledge, only metal nanoparticles such as silver, gold, copper or iron-based ones were shown to promote pathogen eradication.[22-24] However, concerns can be raised upon repetitive administration of metal-based nanoparticles in pathologies such as TB.

Altogether, this interesting and unexpected result shows that pβCD, when administered directly into the lungs, exert two beneficial actions: i) making it possible to administer poorly soluble anti-TB drugs without using organic solvents and to transport them to the lungs, the main site of infection and ii) potentiating the antimycobacterial effect of these drugs with which they synergize through their intrinsic antimycobacterial property.

Indeed, drug administration into the lungs bypasses limitations of some current TB drugs, which are given orally. Besides, when a patient with active TB sneezes, coughs or spits, droplets containing Mtb can be inhaled by surrounding people who can become infected. The main advantages of the drug administration directly into the lungs are that: i) bacteria could be rapidly eradicated and ii) Mtb spreading to other cells could be prevented, which is considered as a main strategy to eradicate infection.[4, 25-27]

pβCD are engulfed by alveolar macrophages after administration

The discovery of the intrinsic antibacterial ability of pβCD prompted us to explore the type of lung cells that could be impacted by this effect. Rhodamine B-conjugated pβCD (Rhod-pβCD) were therefore administered to mice via the e.t. route. Diverse cell subsets, including alveolar or interstitial macrophages, neutrophils, eosinophils, T cells and B lymphocytes, were then examined by flow cytometry for the presence of fluorescent pβCD. Two hours after administration, Rhod-pβCD were preferentially located in alveolar macrophages (CD11c$^+$ F4/80$^+$ SiglecF$^+$) with approximatively 40% of these cells emitting the Rhodamine B fluorescent signal (hence referred as Rhod$^+$) (data not shown). Taken together, these observations showed that at early time points following inoculation, pβCD were mainly internalized by alveolar macrophages in mouse lungs, which are among the main cells used by Mtb as reservoir. This property is of main importance for the delivery of anti-TB drugs. Indeed, the ability for chemical entities to reach Mtb-containing lesions has recently been demonstrated to be an important parameter to take into account during their development.[4] Moreover, having a class of nanoparticles that acts on the interactions between bacteria and the host allows opportunities for the development of macrophage-targeted host-directed therapies (HDT).

The efficient uptake of pβCD by macrophages was further supported by using murine bone marrow-derived macrophages (BMDM), as typical surrogate cells used in in vitro infection experiments. BMDM were incubated with various concentrations of Rhod-pβCD for 24 hours, washed and imaged by confocal microscopy (data not shown). Using the image-analysis software Columbus, all images were segmented to delimit each cell and each intracellular Rhod$^+$ nanoparticles (data not shown). These analyses revealed that more than 80% of the cells had phagocytosed pβCD when added at the concentration of 5 and 25 mg/ml (data not shown). Of note, at lower concentrations of pβCD tested (2 mg/ml), 50% of the cells contained approximatively two Rhod$^+$ nanoparticles highlighting the strong capacity of macrophages to internalize pβCD. The number of BMDM per well was also determined (data not shown) and this parameter informs on the cytotoxicity of pβCD. There was no difference in cell number for concentrations up to 5 mg/ml compared to control non-treated cells, clearly showing that pβCD are not cytotoxic. However, we observed a 40% decrease of the number of cells for samples incubated with pβCD at 25 mg/ml, suggesting that at this very high concentration pβCD induced cell death. It is important to mention that this concentration is likely never reached in lungs of mice. Indeed, with an administration of 50 µl of a solution containing 150 mg/ml of pβCD, mice received approximatively 7.5 mg within lungs covering a pulmonary volume of approximatively 1 ml. The possible genotoxic properties of pβCD are further investigated in the following section.

pβCD are no genotoxic and have poor pro-inflammatory properties

It is generally admitted that βCD are not genotoxic.[22-24, 28] To determine whether the pβCD used in this study share the same properties, their possible genotoxic properties were evaluated on differentiated human macrophage-like THP1 cells, incubated for 24 hours with pβCD and processed for the formation of micronuclei, an indicator of chromosomal damage, or for the "comet" assay, which measures DNA strand breaks.[29, 30] Results showed that pβCD neither induced micronucleus (data not shown) nor DNA damage (data not shown) in comparison to untreated cells up to 25 mg/ml. Altogether this suggests that pβCD are not genotoxic.

We next investigated whether pβCD can induce inflammatory responses, using a highly sensitive dendritic cell maturation assay. Bone marrow-derived dendritic cells (BMDC) were incubated for 24 hours with different concentrations of pβCD and the surface expression of CD40, CD80 and CD86, as well as of Major Histocompatibility Complex (MHC)-class I or -II molecules was studied by flow cytometry to assess the phenotypic maturation of the BMDC. In contrast to the positive control, *Mycobacterium bovis* (*Bacillus* Calmette-Guerin, BCG) at a multiplicity of infection (MOI) of 1, which induced substantial up-regulation of these surface maturation markers (data not shown), pβCD did not modify the expression profile of these markers (data not shown). We also quantified the secretion of targeted cytokines by BMDM that had been incubated with different concentrations of pβCD. We observed that pβCD did not induce secretion of TNF-α or IL-1β inflammatory cytokines up to the concentration of 5 mg/ml. At 25 mg/ml, the production of IL-1β and TNF-α by BMDMs increased to 400 pg/ml and 200 pg/ml respectively upon an overnight incubation with pβCD at 25 mg/ml, although their levels remained much lower than the positive control used here (BCG vaccine) with 1100 pg/ml and 700 pg/ml respectively. Altogether these results showed that pβCD had only very low pro-inflammatory effect at high concentration and no potential for inflammasome activation (data not shown).

pβCD prevent Mtb uptake by macrophages via cholesterol depletion

It is well recognised that monomeric βCD affect the cholesterol content of plasma membranes and disturb lipid raft distribution.[31-34] We therefore examined the effect of pβCD on the BMDM plasma membrane using a green-fluorescent Cholera toxin B subunit (CTB-FITC) as a marker that binds to cholesterol and lipid rafts. BMDM were first incubated with various concentrations of pβCD and then labelled with CTB-FITC. In control macrophages, cholesterol was detected exclusively on the plasma membrane, whereas in pβCD-treated cells, cholesterol was depleted from the plasma membrane and distributed in a diffuse manner throughout the cytosol (data not shown), which indicates a translocation of plasma membrane cholesterol subsequent to pβCD treatment.

As cholesterol plays an essential role in the entry of mycobacteria into macrophages,[35, 36] we wondered whether pβCD could affect the uptake of Mtb in cells. BMDM were first incubated with pβCD at various concentrations for either 2 or 16 hours. After washing, red-fluorescent Mtb (H37Rv-pMRF1) was added at a MOI of 2. Two hours later, the cells were fixed and stained with DAPI (DNA marker) and the percentage of cells containing mycobacteria was determined by automated confocal microscopy and image analysis. Around 40% of BMDM harboured Mtb in control cells (Cont), whereas less than 25% of pβCD-treated BMDM showed intracellular Mtb independent of the concentrations tested (data not shown). The effect was even more striking when BMDM had been pre-incubated with pβCD for 16 hours (data not shown). Only 11% of BMDM were found infected in presence of 2 mg/ml of pβCD. A maximal reduction of 7% was found at a pβCD concentration of 25 mg/ml. Thus, these data demonstrate that pβCD inhibit macrophage colonization in vitro by inducing the depletion of cholesterol at the plasma membrane. Our data suggest a direct correlation between the inhibition of the bacterial uptake in vitro and the reduced Mtb infection in vivo. This may be explained by the fact that the bacterium does not reach its intracellular niche, where it replicates. It was also reported that lipid rafts are needed for translocation of innate immune receptors like TLR2 during Mtb infection,[37] raising the hypothesis that cholesterol depletion by pβCD could impair innate immune response against bacteria. These hypotheses deserve further investigations.

pβCD impair in vitro Mtb replication and induce host cell apoptosis

We next investigated the abilities of pβCD to modulate the replication of Mtb inside macrophages. BMDM were infected with red-fluorescent Mtb (H37Rv-pMRF1) at a MOI of 2 for 4 hours before extensive washing to remove extracellular bacteria. 24 hours post infection, cells were incubated with pβCD at concentrations ranging from 1 mg/ml to 25 mg/ml during 5 days before being fixed and the cell nuclei labelled with DAPI. After image acquisition, a dedicated image analysis enabled the quantification of the bacterial area per infected cell, which is biological correlate of infection corresponding to the bacterial load per cell (data not shown). In non-treated macrophages (Cont.), the bacterial area reached around 400 pixels$^2$ 5 days post infection. Interestingly, infected cells that were incubated with pβCD resulted in a bacterial area lower than 300 pixels$^2$ demonstrating that pβCD reduce Mtb replication.

Taking into account this observation, the cytosolic translocation of cholesterol (data not shown) and the fact that targeting cholesterol by βCD renders cells more sensitive to apoptosis,[31, 32, 38] we investigated whether treatment with pβCD is pro-apoptotic for macrophages. BMDM were incubated with various concentrations of pβCD for 24 hours, prior to fixation and labelling with Annexin V and a DNA intercalating dye. In this assay, necrotic cells are single positive for the DNA intercalating dye, while cells in early apoptosis are single positive for Annexin V, and late apoptotic cells are double positive. While untreated BMDM were double negative in this assay, cells incubated with pβCD were single positive for Annexin V in contrast to the BMDM treated with staurosporine that typically leads to late apoptotic, double positive cells (data not shown).This effect is important to counteract the blockade of host cell apoptosis, previously reported for Mtb.[39] Moreover, Mtb eludes immunity and disseminates in a necrosis-dependent manner. Therefore, reprogramming the host cell death toward apoptosis can be detrimental to mycobacterial growth.[40] In addition, the host is able to kill bacteria through efferocytosis, by which Mtb-infected macrophages in apoptosis are rapidly phagocytized by uninfected bystander macrophages.[41]

pβCD induce in vivo apoptosis in lungs impairing reservoir for Mtb

We next studied the cell composition of lung immune cells after e.t. administration of pβCD. BALB/c mice (n=4 per group) received via e.t. 50 μl of pβCD at 150 mg/ml and at various time points post administration, the cell populations were studied by flow cytometry. As expected, an increase in the absolute numbers of neutrophils was observed as soon as 2 hours post inoculation (data not shown). Slight decreases were observed in the absolute numbers of interstitial macrophages and eosinophils at 2 hours, while an increase was detected in the absolute number of and T and B lymphocytes were increased at 24 hours post inoculation. Only the increase in the B lymphocytes persisted until 72 hours post inoculation. In contrast, inoculation of pβCD caused a 10-fold decrease in the number of alveolar macrophages as soon as 24 hours post inoculation. This last observation, together with the previous results, suggested that pβCD were mainly ingested by alveolar macrophages leading to their apoptotic death. To prove our hypothesis, the quantification of apoptotic cells in lungs of infected mice that had been priory treated with pβCD was performed. BALB/c mice were infected via i.n. route with Mtb and treated with pβCD (50 μl at 150 mg/ml) at day 7, 9, 11, 14, 16 and 18. At 21 days post infection, mice were anesthetized and received via i.n. the NucView 488 caspase-3 substrate that labels apoptotic cells. After one hour, mice were euthanized and their lungs were then fixed and prepared for histology. Samples were sliced of 10 μm and stained with DAPI for fluorescent microscopic analysis (data not shown). Results showed that pβCD administration increased 4 times the number of apoptotic cells in lungs of infected mice in comparison with non-treated infected mice. Thus, our results suggest that pulmonary administration of pβCD may result in a transient but drastic depletion of alveolar macrophages by inducing apoptotic cell death.

Of note, the in vivo depletion of alveolar macrophages by pβCD treatment is rapid and transient, suggesting it has little impact on lung homeostasis. In support to our findings, a recent study showed that specific depletion of alveolar macrophages by pulmonary administration of liposomal formulations lead to a decrease of lung Mtb burden with similar efficacy as the pβCD treatment performed in the present study.[42]

pβCD antibacterial activity is specific for Mtb in vivo

To establish whether such intrinsic inhibitory effect was specific to pβCD or shared by other nanocarriers, we expanded the study to other unloaded nanoparticles. Firstly, we investigated the effect against an Mtb challenge of nanoparticles of poly-α-CD (pαCD) and poly-γ-CD (pγCD), for which no genotoxicity was observed (data not shown). Interestingly, we observed that pβCD had an antibacterial activity but not pαCD neither pγCD (FIG. 2A).

Of note, the pαCD and pγCD NPs were less prone to solubilize both drugs (ETH and BDM43266) than pβCD (FIG. 2B). As shown in FIG. 2B, the apparent solubility of both ETH and Booster increased linearly by increasing pCD concentrations, which was also the case with native CDs (data not shown). The phase solubility diagram was a typical AL-type[43] indicating the formation of soluble ETH/CD and Booster/CD complexes. All the CDs or pCDs were able to increase the apparent solubility of both drugs. Interestingly, it appears that both ETH and Booster are better accommodated in the cavity of βCD as compared to the other types of CDs, as shown by the obtained $K_{1:1}$ of 24, 100, and 47 for αCD, βCD, and γCD, respectively, in the case of ETH; 100, 514, and 256 in the case of Booster (data not shown). Compared to these native CD monomers, the pCDs were more efficient to enhance the apparent solubilities, especially for the Booster. For example, $K_{1:1}$ of Booster was 100 for αCD, and 503 for pαCD, which is possibly due to the contributions of hydrophobic microdomains formed in the cross-linked pβCD. In a nutshell, pβCD was the best among all tested CD-based materials to increase the apparent solubility of both drugs, achieving $K_{1:1}$ of 110 and 1037 for ETH and Booster, respectively. Moreover, this polymer is highly water soluble, allowing a dramatic increase of the apparent solubility of both ETH and the Booster and avoiding crystallization issues.[18] Together, these results show that pβCD are a good candidate to study its intrinsic antibacterial activity.

We further investigate the intrinsic antimycobacterial properties of nanoparticles made of poly (lactic-co-glycolic acid) (PLGA), one of the most widely employed biomaterials for drug loading,[44, 45] and the more recently developed highly porous hybrid nanoparticles made of Metal-Organic Frameworks (nanoMOF).[46] PLGA nanoparticles and nanoMOFs were administered i.n. at the highest doses for which there was no aggregation. Subsequent to 6 i.n. administrations of nanoparticles, we detected no effect on mycobacterial loads in nanoMOF-treated mice, but a slight decrease of ½-log in the bacterial loads in PLGA-treated mice, which however did not reach that observed in pβCD-treated mice (FIG. 2C).

Finally, we sought to determine whether the antibacterial effect of pβCD was specific to tuberculosis bacilli. We thus evaluated the effect of pβCD on bacterial loads in mouse models of infection with: (i) *Brucella abortus*, the causative agent of Brucellosis, or (ii) *Bordetella pertussis*, the causative agent of whooping cough. *B. abortus* is a facultative intracellular Gram-negative coccobacillus, which infects mammals and may cause fetus abortion. Human brucellosis is a zoonotic infection transmitted mainly through ingestion and inhalation.[47] *B. pertussis* is an extracellular bacterium causing whooping cough or pertussis, a severe respiratory disease that can be life threatening in young infants. Both bacterial pathogens colonize the respiratory tract and persist several days in lungs after challenge. Administration of pβCD in the lung of mice infected with either *B. abortus* or *B. pertussis* had no impact on the bacterial load, as determined respectively at d 21 and d 14 post challenge, in contrast to the effects observed in the Mtb mouse model (FIG. 2D). This suggests that pβCD act in a specific manner by interfering with macrophage colonization by Mtb. The absence of pβCD effect on *B. pertussis* may result from the fact that this pathogen, in contrast to Mtb, is an extracellular bacterium and thus its in vivo replication is not directly dependent on macrophages impacted by the pβCD treatment. The fact that pβCD have no effect on the intracellular pathogen *B. abortus*, underscores a cellular mechanism that is a not common with other intracellular bacteria and which deserves more investigation. Thus, the antibacterial effect of pβCD in the lung is specific and helps host cells to control Mtb infection.

Conclusions:

Current TB therapy is characterized by a complex drug regimen that needs to be taken for 6 months, causing problems of toxicity and compliance. Therefore, treating TB remains a challenge given the complexity and the lack of understanding of many aspects of the basic biology underlying this disease. The limitations of conventional therapies and the increasing incidence of MDR- and XDR-TB underpin the need for innovative therapeutic approaches. One of them consists of using nanotechnologies to combat microbial resistance.[20]

Taken together, we showed that e.t. administration of pβCD to Mtb-exposed mice leads to a decrease of Mtb burden, which is concomitant with reprogramming the properties of alveolar macrophages. Pulmonary administration of pβCD induces transitory depletions of one of the main Mtb reservoir cells, which could contribute to the decrease of Mtb burden via efferocytosis of apoptotic alveolar macrophages containing surviving bacteria. Moreover, with the specific depletion of membrane cholesterol in alveolar macrophages, extracellular bacteria will be less likely to invade their neighbouring cells. In summary, we identified a promising tool, which not only improves drug bio-availability at the site of infection, but also makes macrophages less permissive to Mtb replication. The search for new molecules able to boost host capacities for Mtb killing is considered as a promising strategy to counteract the limitation of current TB treatment and the appearance of MDR mycobacteria.[48] βCD-based nanoparticles represent a potent drug carrier that could contribute to move this concept forward. This activity could fit into the emerging and promising concept of anti-TB approaches by host-directed therapy (HDT), which aims to empower host immune properties for the elimination of mycobacteria and/or for the reduction of tissue damage induced by the infection.[49]

REFERENCES

Throughout this application, various references describe the state of the art to which this invention pertains. The disclosures of these references are hereby incorporated by reference into the present disclosure.

1. WHO, Global Tuberculosis Report 2018. 2018.
2. Gandhi, N. R.; Nunn, P.; Dheda, K.; Schaaf, H. S.; Zignol, M.; van Soolingen, D.; Jensen, P.; Bayona, J., Multidrug-Resistant and Extensively Drug-Resistant Tuberculosis: a Threat to Global Control of Tuberculosis. Lancet. 2010, 375, 1830-43.
3. Queval, C. J.; Brosch, R.; Simeone, R., The Macrophage: A Disputed Fortress in the Battle Against *Mycobacterium tuberculosis*. Front Microbiol. 2017, 8, 2284.
4. Prideaux, B.; Via, L. E.; Zimmerman, M. D.; Eum, S.; Sarathy, J.; O'Brien, P.; Chen, C.; Kaya, F.; Weiner, D. M.; Chen, P. Y.; Song, T.; Lee, M.; Shim, T. S.; Cho, J. S.; Kim, W.; Cho, S. N.; Olivier, K. N.; Barry, C. E., 3rd; Dartois, V., The Association Between Sterilizing Activity and Drug Distribution Into Tuberculosis Lesions. Nat Med. 2015, 21, 1223-7.
5. Hickey, A. J.; Durham, P. G.; Dharmadhikari, A.; Nardell, E. A., Inhaled Drug Treatment for Tuberculosis: Past Progress and Future Prospects. J Control Release. 2016, 240, 127-134.
6. Dakal, T. C.; Kumar, A.; Majumdar, R. S.; Yadav, V., Mechanistic Basis of Antimicrobial Actions of Silver Nanoparticles. Front Microbiol. 2016, 7, 1831.
7. Chen, W.; Cheng, C. A.; Lee, B. Y.; Clemens, D. L.; Huang, W. Y.; Horwitz, M. A.; Zink, J. I., A Facile Strategy Enabling Both High Loading and High Release Amounts of the Water-insoluble Drug Clofazimine Using Mesoporous Silica Nanoparticles. ACS Appl Mater Interfaces. 2018, 10, 31870-31881.
8. Huo, S.; Jiang, Y.; Gupta, A.; Jiang, Z.; Landis, R. F.; Hou, S.; Liang, X. J.; Rotello, V. M., Fully Zwitterionic Nanoparticle Antimicrobial Agents through Tuning of Core Size and Ligand Structure. ACS Nano. 2016, 10, 8732-7.
9. Fenaroli, F.; Repnik, U.; Xu, Y.; Johann, K.; Van Herck, S.; Dey, P.; Skjeldal, F. M.; Frei, D. M.; Bagherifam, S.; Kocere, A.; Haag, R.; De Geest, B. G.; Barz, M.; Russell, D. G.; Griffiths, G., Enhanced Permeability and Retention-like Extravasation of Nanoparticles From the Vasculature Into Tuberculosis Granulomas in Zebrafish and Mouse Models. ACS Nano. 2018, 12, 8646-8661.
10. Fenaroli, F.; Westmoreland, D.; Benjaminsen, J.; Kolstad, T.; Skjeldal, F. M.; Meijer, A. H.; van der Vaart, M.; Ulanova, L.; Roos, N.; Nystrom, B.; Hildahl, J.; Griffiths, G., Nanoparticles as Drug Delivery System Against Tuberculosis in Zebrafish Embryos: Direct Visualization and Treatment. ACS Nano. 2014, 8, 7014-26.
11. Pelgrift, R. Y.; Friedman, A. J., Nanotechnology as a Therapeutic Tool to Combat Microbial Resistance. Adv Drug Deliv Rev. 2013, 65, 1803-15.
12. Pancani, E.; Menendez-Miranda, M.; Pastor, A.; Brisset, F.; Bernet-Camard, M. F.; Desmaele, D.; Gref, R., Nanoparticles With High Payloads of Pipemidic Acid, a Poorly Soluble Crystalline Drug: Drug-Initiated Polymerization and Self-Assembly Approach. Acta Pharm Sin B. 2018, 8, 420-431.
13. Costa-Gouveia, J.; Pancani, E.; Jouny, S.; Machelart, A.; Delorme, V.; Salzano, G.; Iantomasi, R.; Piveteau, C.; Queval, C. J.; Song, O. R.; Flipo, M.; Deprez, B.; Saint-Andre, J. P.; Hureaux, J.; Majlessi, L.; Willand, N.; Baulard, A.; Brodin, P.; Gref, R., Combination Therapy for Tuberculosis Treatment: Pulmonary Administration of Ethionamide and Booster Co-Loaded Nanoparticles. Sci Rep. 2017, 7, 5390.
14. Willand, N.; Dirie, B.; Carette, X.; Bifani, P.; Singhal, A.; Desroses, M.; Leroux, F.; Willery, E.; Mathys, V.; Deprez-Poulain, R., Synthetic EthR Inhibitors Boost Antituberculous Activity of Ethionamide. Nat Med. 2009, 15, 537-544.
15. Russell, D. G.; Huang, L.; VanderVen, B. C., Immunometabolism at the Interface Between Macrophages and Pathogens. Nat Rev Immunol. 2019.
16. Baulard, A. R.; Betts, J. C.; Engohang-Ndong, J.; Quan, S.; McAdam, R. A.; Brennan, P. J.; Locht, C.; Besra, G. S., Activation of the Pro-Drug Ethionamide is Regulated in Mycobacteria. J Biol Chem. 2000, 275, 28326-31.
17. Villemagne, B.; Flipo, M.; Blondiaux, N.; Crauste, C.; Malaquin, S.; Leroux, F.; Piveteau, C.; Villeret, V.; Brodin, P.; Villoutreix, B. O.; Sperandio, O.; *Soror*, S. H.; Wohlkonig, A.; Wintjens, R.; Deprez, B.; Baulard, A. R.; Willand, N., Ligand Efficiency Driven Design of New Inhibitors of *Mycobacterium tuberculosis* Transcriptional Repressor EthR Using Fragment Growing, Merging, and Linking Approaches. J Med Chem. 2014, 57, 4876-88.
18. Salzano, G.; Wankar, J.; Ottani, S.; Villemagne, B.; Baulard, A. R.; Willand, N.; Brodin, P.; Manet, I.; Gref, R., Cyclodextrin-Based Nanocarriers Containing a Synergic Drug Combination: A Potential Formulation for Pulmonary Administration of Antitubercular Drugs. Int J Pharm. 2017, 531, 577-587.
19. Andrade, F.; Rafael, D.; Videira, M.; Ferreira, D.; Sosnik, A.; Sarmento, B., Nanotechnology and Pulmonary Delivery to Overcome Resistance in Infectious Diseases. Adv Drug Deliv Rev. 2013, 65, 1816-27.
20. Costa-Gouveia, J.; Ainsa, J. A.; Brodin, P.; Lucia, A., How Can Nanoparticles Contribute to Antituberculosis Therapy? Drug Discov Today. 2017, 22, 600-607.
21. Gnanadhas, D. P.; Ben Thomas, M.; Thomas, R.; Raichur, A. M.; Chakravortty, D., Interaction of Silver Nanoparticles With Serum Proteins Affects Their Antimicrobial Activity In Vivo. Antimicrob Agents Chemother. 2013, 57, 4945-55.
22. Maronpot, R. R.; Hobbs, C. A.; Davis, J.; Swartz, C.; Boyle, M.; Koyanagi, M.; Hayashi, S. M., Genetic and Rat Toxicity Studies of Cyclodextrin Glucanotransferase. Toxicol Rep. 2016, 3, 381-392.
23. Kurkov, S. V.; Loftsson, T., Cyclodextrins. Int J Pharm. 2013, 453, 167-180.
24. Shelat, R.; Chandra, S.; Khanna, A., Detailed Toxicity Evaluation of Beta-Cyclodextrin Coated Iron Oxide Nanoparticles for Biomedical Applications. Int J Biol Macromol. 2018, 110, 357-365.
25. Bivas-Benita, M.; Ottenhoff, T. H.; Junginger, H. E.; Borchard, G., Pulmonary DNA Vaccination: Concepts, Possibilities and Perspectives. J Control Release. 2005, 107, 1-29.
26. Misra, A.; Hickey, A. J.; Rossi, C.; Borchard, G.; Terada, H.; Makino, K.; Fourie, P. B.; Colombo, P., Inhaled Drug Therapy for Treatment of Tuberculosis. Tuberculosis (Edinb). 2011, 91, 71-81.
27. Sharma, A.; Sharma, S.; Khuller, G. K., Lectin-Functionalized Poly (Lactide-Co-Glycolide) Nanoparticles as Oral/Aerosolized Antitubercular Drug Carriers for Treatment of Tuberculosis. J Antimicrob Chemother. 2004, 54, 761-6.
28. Stella, V. J.; He, Q., Cyclodextrins. Toxicol Pathol. 2008, 36, 30-42.
29. Elespuru, R.; Pfuhler, S.; Aardema, M. J.; Chen, T.; Doak, S. H.; Doherty, A.; Farabaugh, C. S.; Kenny, J.; Manjanatha, M.; Mahadevan, B.; Moore, M. M.; Ouedraogo, G.; Stankowski, L. F., Jr.; Tanir, J. Y., Genotoxicity Assessment of Nanomaterials: Recommendations on Best Practices, Assays, and Methods. Toxicol Sci. 2018, 164, 391-416.
30. Udroiu, I.; Sgura, A., Cytogenetic Tests for Animal Production: State of the Art and Perspectives. Anim Genet. 2017, 48, 505-515.
31. Yamaguchi, R.; Perkins, G.; Hirota, K., Targeting Cholesterol With Beta-Cyclodextrin Sensitizes Cancer Cells for Apoptosis. FEBS Lett. 2015, 589, 4097-105.
32. Badana, A. K.; Chintala, M.; Gavara, M. M.; Naik, S.; Kumari, S.; Kappala, V. R.; Iska, B. R.; Malla, R. R., Lipid Rafts Disruption Induces Apoptosis by Attenuating Expression of LRP6 and Survivin in Triple Negative Breast Cancer. Biomed Pharmacother. 2018, 97, 359-368.
33. Zidovetzki, R.; Levitan, I., Use of cyclodextrins to manipulate plasma membrane cholesterol content: evidence, misconceptions and control strategies. Biochim Biophys Acta 2007, 1768 (6), 1311-24.
34. Hinzey, A. H.; Kline, M. A.; Kotha, S. R.; Sliman, S. M.; Butler, E. S.; Shelton, A. B.; Gurney, T. R.; Parinandi, N. L., Choice of cyclodextrin for cellular cholesterol depletion for vascular endothelial cell lipid raft studies: cell membrane alterations, cytoskeletal reorganization and cytotoxicity. Indian J Biochem Biophys 2012, 49 (5), 329-41.
35. Gatfield, J.; Pieters, J., Essential role for cholesterol in entry of mycobacteria into macrophages. Science 2000, 288 (5471), 1647-50.
36. Munoz, S.; Rivas-Santiago, B.; Enciso, J. A., *Mycobacterium tuberculosis* entry into mast cells through cholesterol-rich membrane microdomains. Scand J Immunol 2009, 70 (3), 256-63.
37. Shin, D. M.; Yang, C. S.; Lee, J. Y.; Lee, S. J.; Choi, H. H.; Lee, H. M.; Yuk, J. M.; Harding, C. V.; Jo, E. K., *Mycobacterium tuberculosis* lipoprotein-induced association of TLR2 with protein kinase C zeta in lipid rafts contributes to reactive oxygen species-dependent inflammatory signalling in macrophages. Cell Microbiol 2008, 10 (9), 1893-905.
38. Chen, Y. C.; Gowda, R.; Newswanger, R. K.; Leibich, P.; Fell, B.; Rosenberg, G.; Robertson, G. P., Targeting cholesterol transport in circulating melanoma cells to inhibit metastasis. Pigment Cell Melanoma Res 2017, 30 (6), 541-552.
39. Schaaf, K.; Smith, S. R.; Duverger, A.; Wagner, F.; Wolschendorf, F.; Westfall, A. O.; Kutsch, O.; Sun, J., *Mycobacterium tuberculosis* exploits the PPM1A signaling pathway to block host macrophage apoptosis. Scientific reports 2017, 7, 42101.
40. Lam, A.; Prabhu, R.; Gross, C. M.; Riesenberg, L. A.; Singh, V.; Aggarwal, S., Role of apoptosis and autophagy in tuberculosis. Am J Physiol Lung Cell Mol Physiol 2017, 313 (2), L218-L229.
41. Martin, C. J.; Booty, M. G.; Rosebrock, T. R.; Nunes-Alves, C.; Desjardins, D. M.; Keren, I.; Fortune, S. M.; Remold, H. G.; Behar, S. M., Efferocytosis is an innate antibacterial mechanism. Cell Host Microbe 2012, 12 (3), 289-300.
42. Huang, L.; Nazarova, E. V.; Tan, S.; Liu, Y.; Russell, D. G., Growth of *Mycobacterium tuberculosis* in vivo segregates with host macrophage metabolism and ontogeny. J Exp Med 2018, 215 (4), 1135-1152.
43. Saokham, P.; Muankaew, C.; Jansook, P.; Loftsson, T., Solubility of Cyclodextrins and Drug/Cyclodextrin Complexes. Molecules 2018, 23 (5).
44. Petros, R. A.; DeSimone, J. M., Strategies in the design of nanoparticles for therapeutic applications. Nat Rev Drug Discov 2010, 9 (8), 615-27.
45. Shive, M. S.; Anderson, J. M., Biodegradation and biocompatibility of PLA and PLGA microspheres. Advanced drug delivery reviews 1997, 28 (1), 5-24.
46. Horcajada, P.; Chalati, T.; Serre, C.; Gillet, B.; Sebrie, C.; Baati, T.; Eubank, J. F.; Heurtaux, D.; Clayette, P.; Kreuz, C.; Chang, J. S.; Hwang, Y. K.; Marsaud, V.; Bories, P. N.; Cynober, L.; Gil, S.; Ferey, G.; Couvreur, P.; Gref, R., Porous metal-organic-framework nanoscale carriers as a potential platform for drug delivery and imaging. Nat Mater 2010, 9 (2), 172-8.
47. Godfroid, J.; Cloeckaert, A.; Liautard, J. P.; Kohler, S.; Fretin, D.; Walravens, K.; Garin-Bastuji, B.; Letesson, J. J., From the discovery of the Malta fever's agent to the discovery of a marine mammal reservoir, brucellosis has continuously been a re-emerging zoonosis. Vet Res 2005, 36 (3), 313-26.
48. Machelart, A.; Song, O. R.; Hoffmann, E.; Brodin, P., Host-directed therapies offer novel opportunities for the fight against tuberculosis. Drug Discov Today 2017.
49. Kaufmann, S. H. E.; Dorhoi, A.; Hotchkiss, R. S.; Bartenschlager, R., Host-directed therapies for bacterial and viral infections. Nat Rev Drug Discov 2018, 17 (1), 35-56.
50. Gref, R.; Amiel, C.; Molinard, K.; Daoud-Mahammed, S.; Sebille, B.; Gillet, B.; Beloeil, J. C.; Ringard, C.; Rosilio, V.; Poupaert, J.; Couvreur, P., New self-assembled nanogels based on host-guest interactions: characterization and drug loading. Journal of controlled release: official journal of the Controlled Release Society 2006, 111 (3), 316-24.
51. Othman, M.; Bouchemal, K.; Couvreur, P.; Desmaele, D.; Morvan, E.; Pouget, T.; Gref, R., A comprehensive study of the spontaneous formation of nanoassemblies in water by a "lock-and-key" interaction between two associative polymers. J Colloid Interface Sci 2011, 354 (2), 517-27.
52. Aykaç, A.; Noiray, M.; Malanga, M.; Agostoni, V.; Casas-Solvas J M, Fenyvesi E, Gref R, Vargas-Berenguel A., A non-covalent "click chemistry" strategy to efficiently coat highly porous MOF nanoparticles with a stable polymeric shell. Biochim Biophys Acta. 2017, 1861(6), 1606-1616.
53. Rodriguez-Ruiz, V.; Maksimenko, A.; Anand, R.; Monti, S.; Agostoni, V.; Couvreur, P.; Lampropoulou, M.; Yannakopoulou, K.; Gref, R., Efficient "green" encapsulation of a highly hydrophilic anticancer drug in metal-organic framework nanoparticles. Journal of drug targeting 2015, 23 (7-8), 759-67.
54. Deboosere, N.; Iantomasi, R.; Queval, C. J.; Song, O. R.; Deloison, G.; Jouny, S.; Debrie, A. S.; Chamaillard, M.; Nigou, J.; Cohen-Gonsaud, M.; Locht, C.; Brodin, P.; Veyron-Churlet, R., LppM impact on the colonization of macrophages by *Mycobacterium tuberculosis*. Cell Microbiol 2017, 19 (1).
55. Moche, H.; Chevalier, D.; Vezin, H.; Claude, N.; Lorge, E.; Nesslany, F., Genotoxicity of tungsten carbide-cobalt (WC-Co) nanoparticles in vitro: mechanisms-of-action studies. Mutat Res Genet Toxicol Environ Mutagen 2015, 779, 15-22.
56. Sayes, F.; Sun, L.; Di Luca, M.; Simeone, R.; Degaiffier, N.; Fiette, L.; Esin, S.; Brosch, R.; Bottai, D.; Leclerc, C.; Majlessi, L., Strong immunogenicity and cross-reactivity of *Mycobacterium tuberculosis* ESX-5 type VII secretion: encoded PE-PPE proteins predicts vaccine potential. Cell Host Microbe 2012, 11 (4), 352-63.
57. Machelart, A.; Khadrawi, A.; Demars, A.; Willemart, K.; De Trez, C.; Letesson, J. J.; Muraille, E., Chronic *Brucella* Infection Induces Selective and Persistent Interferon Gamma-Dependent Alterations of Marginal Zone Macrophages in the Spleen. Infect Immun 2017, 85 (11).
58. Feunou, P. F.; Kammoun, H.; Debrie, A. S.; Locht, C., Heterologous prime-boost immunization with live attenuated *B. pertussis* BPZE1 followed by acellular pertussis vaccine in mice. Vaccine 2014, 32 (34), 4281-8.

The invention claimed is:

1. A method of treating tuberculosis in a patient in need thereof comprising administering to the patient a therapeutically effective amount of at least one material made of cross-linked β-cyclodextrins, wherein the cross-linked β-cyclodextrins form poly-β-cyclodextrins (pβCD), wherein the pβCD are formed by crosslinking in the presence of epichlorohydrin, and wherein the administering step results in at least one beneficial or desired clinical result is selected from the group consisting of, diminishing the extent of the disease, delaying the worsening of the disease, preventing or delaying the spread of the disease, delaying the recurrence of the disease, providing a partial or total remission of the disease, decreasing the dose of one or more other medications required to treat the disease, delaying the progression of the disease, and prolonging survival,
provided that the pβCD are not loaded with ethionamide (ETH) and at least one booster selected from the group consisting of BDM43266 and BDM41906.

2. The method of claim 1 wherein the tuberculosis is pulmonary tuberculosis.

3. The method of claim 1 wherein the tuberculosis is multi-drug resistant tuberculosis.

4. The method of claim 1 wherein the pβCD are nanoparticles loaded with at least one antibiotic selected from the group consisting of gemifloxacin (Factive), levofloxacin (Levaquin), norfloxacin (Noroxin), ethambutol, isoniazid, pyrazinamide, rifampin, rifapentine, amikacin, gentamicin, neomycin and tobramycin.

5. The method of claim 1 wherein the at least one material is administered to the patient in the form of a pharmaceutical composition formulated for intranasal or pulmonary delivery.

6. The method of claim 1 wherein the at least one material is administered by a metered dose inhaler (MDI), a dry powder inhaler (DPI), a nebulizer, an insufflator, a powder sprayer or a powder inhaler.

* * * * *